UNITED STATES PATENT OFFICE.

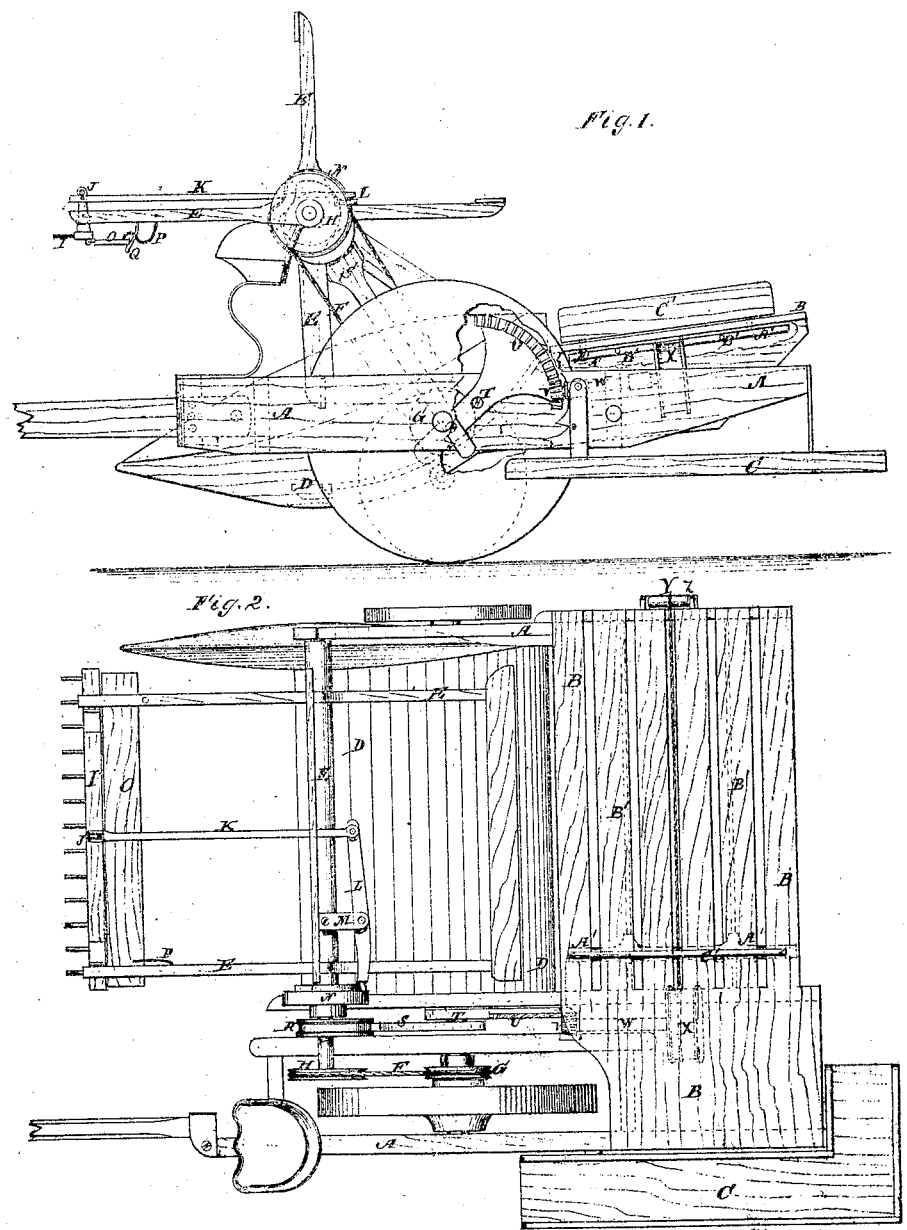

JOHN B. McCORMICK, OF DAYTON, OHIO.

IMPROVEMENT IN HARVESTERS.

*Specification forming part of Letters Patent No. 101,031, dated March 22, 1870.*

*To all whom it may concern:*

Be it known that I, J. B. McCORMICK, of Dayton, in the county of Montgomery and State of Ohio, have invented a new and useful Improvement in Harvesters; and I do hereby declare that the following is a full, clear, and exact description thereof, which will enable others skilled in the art to make and use the same, reference being had to the accompanying drawings, forming part of this specification, in which—

Figure 1 is a side view of my improved harvester, part being broken away to show the construction. Fig. 2 is a top view of the same.

Similar letters of reference indicate corresponding parts.

My invention has for its object to improve the construction of that kind of reapers which are so constructed that the grain may be bound before being dropped from the machine, so as to make them simpler in construction and more effective and satisfactory in operation than when constructed in the usual manner, the improvement in the connection of the rake with the reel having special reference to Letters Patent No. 38,596, granted to me May 19, 1863; and the improvements consist in the construction and combination of the various parts, by means of which the grain is transferred from the cutters to the binders, as hereinafter more fully described.

A is the frame of the machine, to the rear part of which is attached a platform, B, raised to such a height that the binders standing upon the platform C may conveniently take up and bind the grain. The platform C is suspended from the rear part of the frame at such a height as to be clear of the ground.

D is the platform that receives the grain from the cutters, and which is curved in or nearly in the arc of a circle, so that the cut grain may be swept up it to the raised platform B by the reel E. The reel E revolves in bearings in standards attached to the frame A, and receives motion from the drive-wheels by means of a band, F, that passes around a pulley, G, attached to the axle or driving-shaft of the machine, and around a pulley, H, attached to the end of the shaft of the reel E.

I is a rake-head, which is pivoted to the ends of the arms of the reel E, and to the middle part of which is rigidly attached a short inwardly-projecting arm, J, to the free end of which is pivoted the end of the connecting-rod K, several holes being made in the said arm J for the reception of the pivoting-pin, so that the movement of the rake-head may be adjusted as desired. The other end of the connecting-rod K is pivoted to the end of the lever L, which is pivoted to a support or arm, M, attached to the shaft of the reel E. The other end of the lever L enters a cam-groove in a block, N, attached to the standard to which the reel-shaft is pivoted, and through which the journal of said reel-shaft passes.

The cam N, lever L, connecting-rod K, and arm J are so arranged and adjusted as to hold the rake-head vertical as it sweeps up the curved platform D, carrying the grain to the elevated platform B.

By this construction, the rake-head, being held vertical while in contact with the grain, is readily lifted away from said grain, as it passes upon the platform B, without scattering it.

O is a board hinged at one edge to the rake-head I, and which is connected at one end to one of the arms of the reel E by a rope, chain, or other flexible or jointed connection, P. To another arm of the reel E is attached a spring-catch, Q, in such a position that as the reel-arms with which said hinged board O is connected pass up from the platforms D B, the hinged board O will drop down from its own weight upon the arms of the reel, and will be held by the spring-catch Q until the rake-head begins to turn as it passes up the curved platform D. This movement of the rake-head releases the hinged board O from the catch Q, and allows it to drop down and rest upon the grain as it is being swept up the curved platform D.

To the journal of the shaft of the reel E, between the pulley H and the cam N, is attached a cam or eccentric, R, with which is connected the end of the pitman S by a strap in the ordinary manner. The lower end of the pitman S is pivoted to the lower end of the lever T, several holes being formed in the said end of the said lever T to receive the pivoting-pin, so that the movement or throw of the other end of said lever T may be regulated at will.

The lever T is pivoted to the frame A of the machine, and upon its other end is formed or to it is attached a segment of a gear-wheel, U, the teeth of which mesh into the teeth of the small gear-wheel V, attached to the end of the shaft W.

The shaft W revolves in bearings attached to the frame A, and to it is attached a drum or pulley, X, to which are attached and round which, in opposite directions, are wound the ends of the cords or chains Y, one of which passes around the pulley or roller Z, pivoted to the frame A beneath the other end of the platform B, and the other ends of both of which are attached to the bar A'.

The bar A' slides back and forth upon the guide-rods B' attached to the frame A, and to it are attached arms which project upward through slots in the platform B, and to the upper end of which is attached a board, C', extending across the elevated platform B, as shown in Figs. 1 and 2.

By this construction, as the grain is delivered upon the platform B, it is swept across said platform to the binders standing upon the platform C.

Having thus described my invention, I claim as new and desire to secure by Letters Patent—

1. The board O, in combination with the rake-head I and reel E, when arranged to operate as and for the purpose specified.

2. The rake-head I, board O, rope or chain P, catch Q, arm J, connecting-rod K, lever L, and cam N, in combination with the reel E and platform D, when arranged to operate as specified.

3. The combination of the cam R, pitman S, lever T, segmental gear-wheel U, gear-wheel V, shaft W, drum X, ropes or chains Y, roller Z, sliding cross-bar A', and board or rack C', with each other and with the raised platform B and reel E, substantially as herein shown and described, and for the purpose set forth.

J. B. McCORMICK.

Witnesses:
R. ROBINSON,
JNO. W. SHRIVER.